(12) United States Patent
Kelley et al.

(10) Patent No.: US 6,531,237 B2
(45) Date of Patent: Mar. 11, 2003

(54) MANIFOLD AND SEALING ASSEMBLY FOR FUEL CELL STACK

(75) Inventors: Dana A. Kelley, New Milford, CT (US); Richard P. Hayes, Newington, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 09/797,021

(22) Filed: Mar. 1, 2001

(65) Prior Publication Data

US 2002/0164514 A1 Nov. 7, 2002

(51) Int. Cl.[7] .............................................. H01M 8/04
(52) U.S. Cl. ............................................. 429/35; 429/38
(58) Field of Search ............................. 429/34, 35, 37, 429/38, 185

(56) References Cited

U.S. PATENT DOCUMENTS

| | | |
|---|---|---|
| 4,414,294 A | 11/1983 | Guthrie |
| 4,467,018 A | 8/1984 | Schroll |
| 4,514,475 A | 4/1985 | Mientek |
| 4,591,538 A | 5/1986 | Kunz |
| 4,643,954 A | 2/1987 | Smith |
| 4,761,348 A | 8/1988 | Kunz et al. |
| 4,895,774 A * | 1/1990 | Ohzu et al. |
| 5,110,692 A | 5/1992 | Farooque et al. |
| 5,399,438 A | 3/1995 | Tateishi et al. |
| 5,773,161 A | 6/1998 | Farooque et al. |

* cited by examiner

Primary Examiner—Patrick Ryan
Assistant Examiner—Susy Tsang-Foster
(74) Attorney, Agent, or Firm—Robin, Blecker & Daley

(57) ABSTRACT

A manifold and manifold sealing assembly for use with a fuel cell stack having a plurality of faces in which the assembly includes a plurality of frame assemblies and a plurality of manifolds, and at least one frame assembly adjacent a given face of the fuel cell stack provides support for a part of the frame assembly abutting the face of the stack adjacent the one face. Additionally, the manifold abutting the one frame assembly and the manifold abutting the supported frame assembly are adapted to sealingly engage in the area of support.

21 Claims, 6 Drawing Sheets

MANIFOLD AND SEALING ASSEMBLY FOR FUEL CELL STACK

BACKGROUND OF THE INVENTION

This invention relates to fuel cell systems and, in particular, to manifold assemblies for use with the fuel cell stacks of such systems.

In present day fuel cell systems, manifolds are used to supply and extract fuel and oxidant gasses to and from the fuel cell stack of the system. In some cases, the stack is situated in an enclosure and the enclosure serves as a manifold for one of the gasses. In such an arrangement, a minimum of three additional manifolds is required to provide inlet and exit passages for the other gases of the system. In other cases, where an enclosure does not serve as a manifold, a minimum of four manifolds is required In systems of this type, it is also customary to compress the manifolds against the stack. An example of a stack compression system is described for example in copending U.S. patent application Ser. No. 09/651,921, filed Aug. 31, 2000, assigned to the same assignee hereof. In systems of this type it is also conventional to provide a manifold seal assembly for the external manifolds of the system. A typical seal assembly is disclosed, for example, in U.S. Pat No. 4,467,018.

FIG. 1 shows a typical fuel cell stack 1 in which four manifolds are employed. As shown, the stack 1 includes a number of fuel cell assemblies 11A and electrolyte matrices 11B which are stacked on one another. The arrangement of these components is such that the reactant gases flow in the stack 1 in cross-flow configuration. More particularly, the fuel and oxidant gases flow into respective anode and cathode inlet manifolds 2A and 3A, respectively, and then through the stacked cell assemblies. Exhausted fuel and oxidant gases are then extracted from the cell assemblies via anode and cathode outlet manifolds 2B and 3B. Manifold seal assemblies 4 are also provided and act as seals between the manifolds 2A, 3A, 2B and 3B and the stack 1.

More particularly, as shown in FIG. 2, each of the fuel cell assemblies 11 is comprised of a cathode electrode 12, cathode corrugated current collector 13, bipolar plate 14, anode corrugated current collector 15, and anode electrode 16. The bipolar plates 14 include end flaps 14A at each end which provide flat sealing surfaces as discussed in U.S. Pat. Nos. 5,773,161, 5,399,438 and 4,514,475.

These flat surfaces together result in flat vertical peripheral areas 1A for the stack 1, while the end plates 6 provide flat horizontal peripheral areas 1B for the stack. It is against these flat peripheral areas that the anode and cathode manifolds 2A, 2B, 3A and 3B are sealed. Each manifold seal assembly 4 includes a stack side compressible gasket 4A, a dielectric frame assembly 4B and a manifold side compressible gasket 4C, all of which interface with a respective one of the manifolds. These components permit each seal assembly not only topside sealing but also to limit the electrolyte movement from the top to the bottom of the stack, to limit the electrolyte movement from the stack across the dielectric frame assembly to the manifold, and to allow differential movement between the stack and manifold.

More particularly, each gasket 4A provides a seal between the bipolar plates 14 of the fuel cell assemblies 11 and the dielectric frame assembly 4B. The gaskets 4A are further adapted to limit undesirable transport of electrolyte from the positive to negative lend of the stack. If unchecked this electrolyte migration causes the cells at the negative end of the stack to flood and depletes cells of electrolyte from the positive end. Methods of adapting the gaskets 4A in this way are disclosed, for example, in U.S. Pat. Nos. 4,591,538, 4,643,954, 4,761,348 and 5,110,692. These methods, while they reduce electrolyte migration, do not eliminate all the transport and also add cost to the fuel cell stack 1.

The dielectric frame assemblies 4B provide electrical isolation between the stack 1 and the associated metallic manifolds. As shown in FIG. 1, a typical frame assembly includes horizontal and vertical members 5A, 5B which are joined at joints 5C via aligned slots 5D, 5E and a key 5F. This configuration allows for the differential movement between the stack and the frame assembly (see, e.g., U.S. Pat. No. 4,414,294). To withstand stresses caused by the differential movement, the frame assemblies 4B require high-density ceramics. These ceramics must also be highly polished for assuring required voltage isolation, as described in U.S. patent application No. 09/736,549, filed on Dec. 13, 2000, also assigned to the same assignee hereof. As can be appreciated, the need for high-density, highly polished ceramics also increases the overall cost of the fuel cell stack 1.

While the frame assembly of FIG. 1 includes opposing horizontal and opposing vertical members, the term "frame assembly" as used herein is intended to mean an assembly that includes at least two opposing frame members and, hence, includes within its meaning assemblies that have opposing horizontal members only, and assemblies that have both opposing horizontal members and opposing vertical members. As also used herein the term "supporting frame assembly" is intended to mean a frame assembly that supports one or more members of another frame assembly, and the term. "supported frame assembly" is intended to mean a frame assembly having one or more of its members supported by another frame assembly.

It is therefore an object of the present invention to provide a manifold and manifold sealing assembly which overcomes the above-discussed disadvantages of prior assemblies.

It is also an object of the present invention to provide a manifold and manifold sealing assembly having a reduced number of parts.

It is a further object of the present invention to provide a manifold and manifold sealing assembly which permit a reduction in the number of parts of the dielectric frame assemblies and in the number of gaskets.

It is also an object of the present invention to provide a manifold and manifold sealing assembly which permit the use of simplified bipolar plates.

SUMMARY OF THE INVENTION

In accordance with the principles of the present invention, the above and other objectives are realized in a manifold and manifold sealing assembly including a plurality of frame assemblies and a plurality of manifolds. One or more of the frame assemblies is a supporting frame assembly and one or more of the frame assemblies is a supported frame assembly. Each supporting frame provides structural support for a part of one of the supported frame assemblies facing a face of the fuel cell stack adjacent to the face faced by the supporting frame assembly. In further accordance with the invention, the manifold abutting a supporting frame assembly is adapted to sealing engage with areas of the manifold abutting the associated supported frame assembly.

In the embodiment of the invention to be disclosed hereinafter, each supporting frame assembly includes a vertical member adjacent to a vertical side of the associated fuel cell stack face which supports at its upper and lower ends upper and lower horizontal members of the associated supported frame assembly. These horizontal members are, in turn, situated adjacent to upper and lower ends of the associated fuel cell stack face.

Also, in this embodiment, each manifold situated adjacent to a supporting frame assembly has a peripheral flange having a vertical side with an extension which extends beyond the vertical end of the associated fuel cell stack face. This extension serves as a sealing member for a vertical side of the peripheral flange of the manifold situated adjacent to the supported frame. The latter manifold has a central region which extends beyond the vertical edge of the associated fuel cell stack face so as to permit the sealing engagement.

Additionally, in the disclosed embodiment, a supported frame assembly abutting a given face of the fuel cell stack is supported by two supporting frame assemblies abutting the faces of the stack which are adjacent the opposite vertical sides of the given face. In the disclosed four face stack, two supporting frame assemblies abut opposite faces of the stack and support two supported frame assemblies which abut the other two opposite faces of the stack. In this case, each supporting frame assembly includes vertical members adjacent opposite vertical edges of the associated fuel cell stack face, one of which supports upper and lower horizontal members of the supported frame assembly abutting one of the adjacent fuel cell stack faces and the other of which supports upper and lower horizontal members of the supported frame assembly abutting the other of the adjacent fuel cell stack faces.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 3:
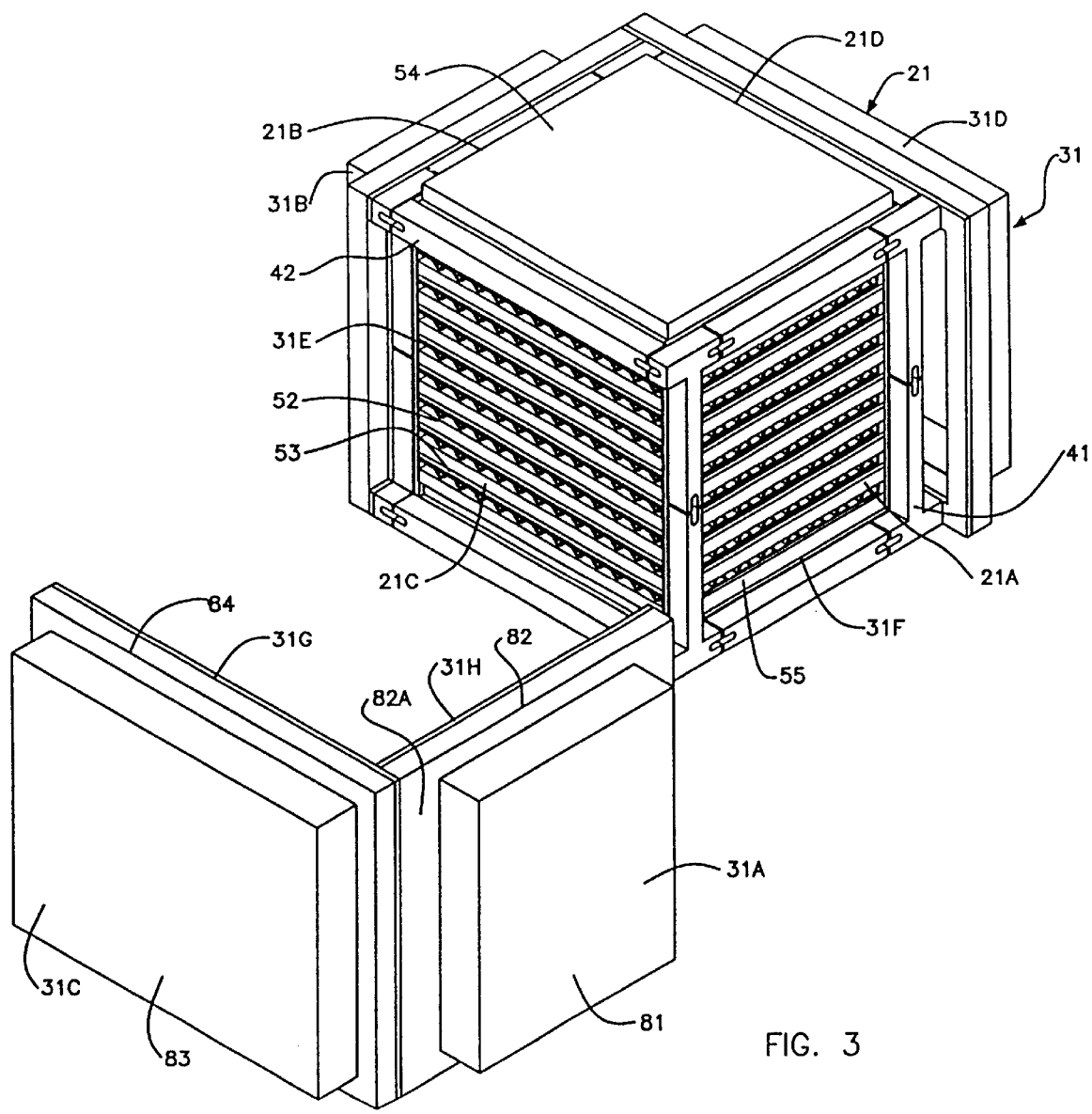
FIG. 3 shows a fuel cell stack employing a manifold and manifold sealing assembly in accordance with the principles of the present invention.

FIG. 3 shows a fuel cell stack 21 employing a manifold and manifold sealing assembly 31 in accordance with the principles of the present invention. The fuel cell stack 21 includes a plurality of fuel cell assemblies 52 which are stacked on one another and between each pair of which is disposed a fuel cell matrix 53. End plates 54 and 55 are situated above and below the uppermost and the lowermost assemblies 52.

Figure 2:
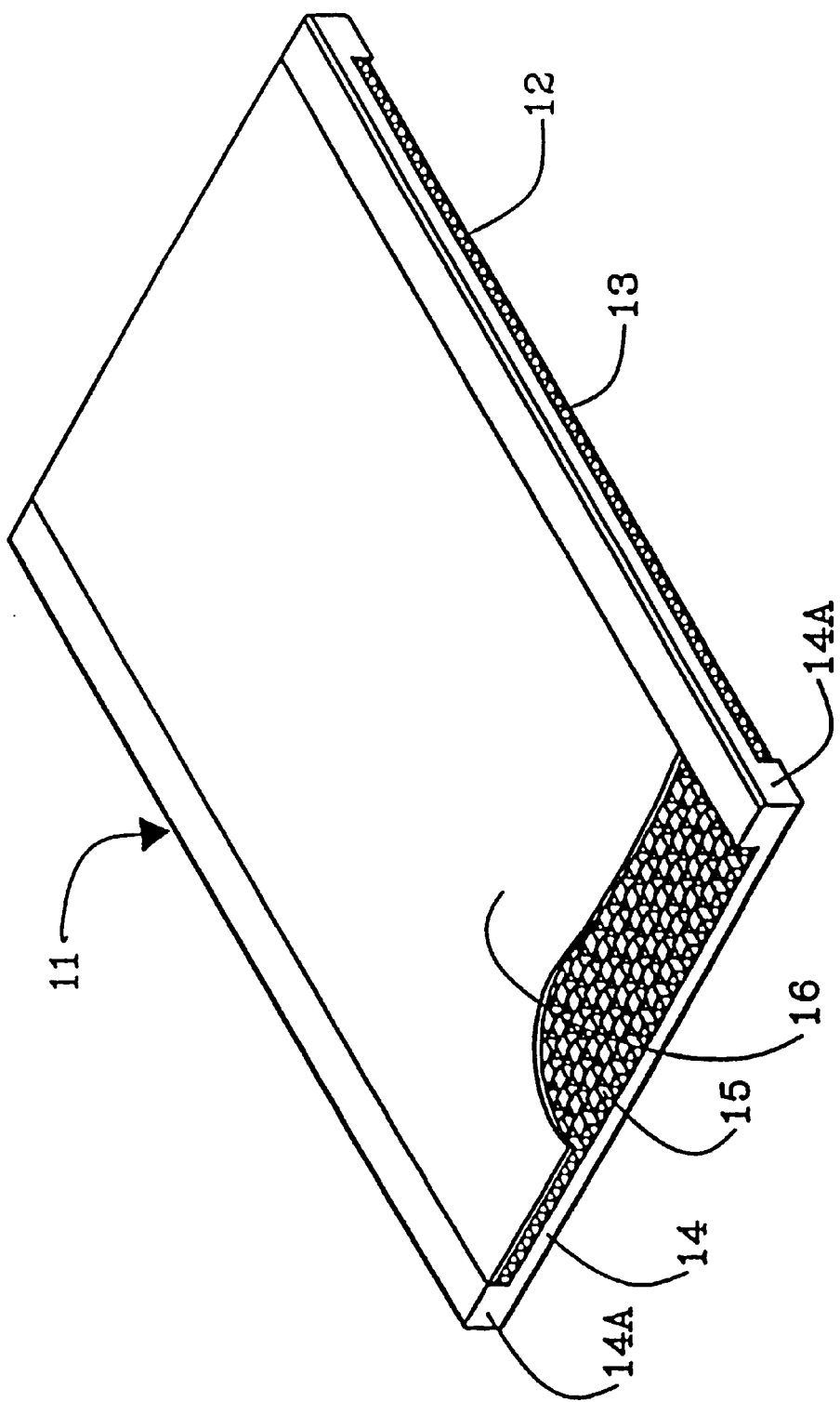
FIG. 2 shows a fuel cell assembly used in the fuel cell stack of FIG. 1.
Figure 5:
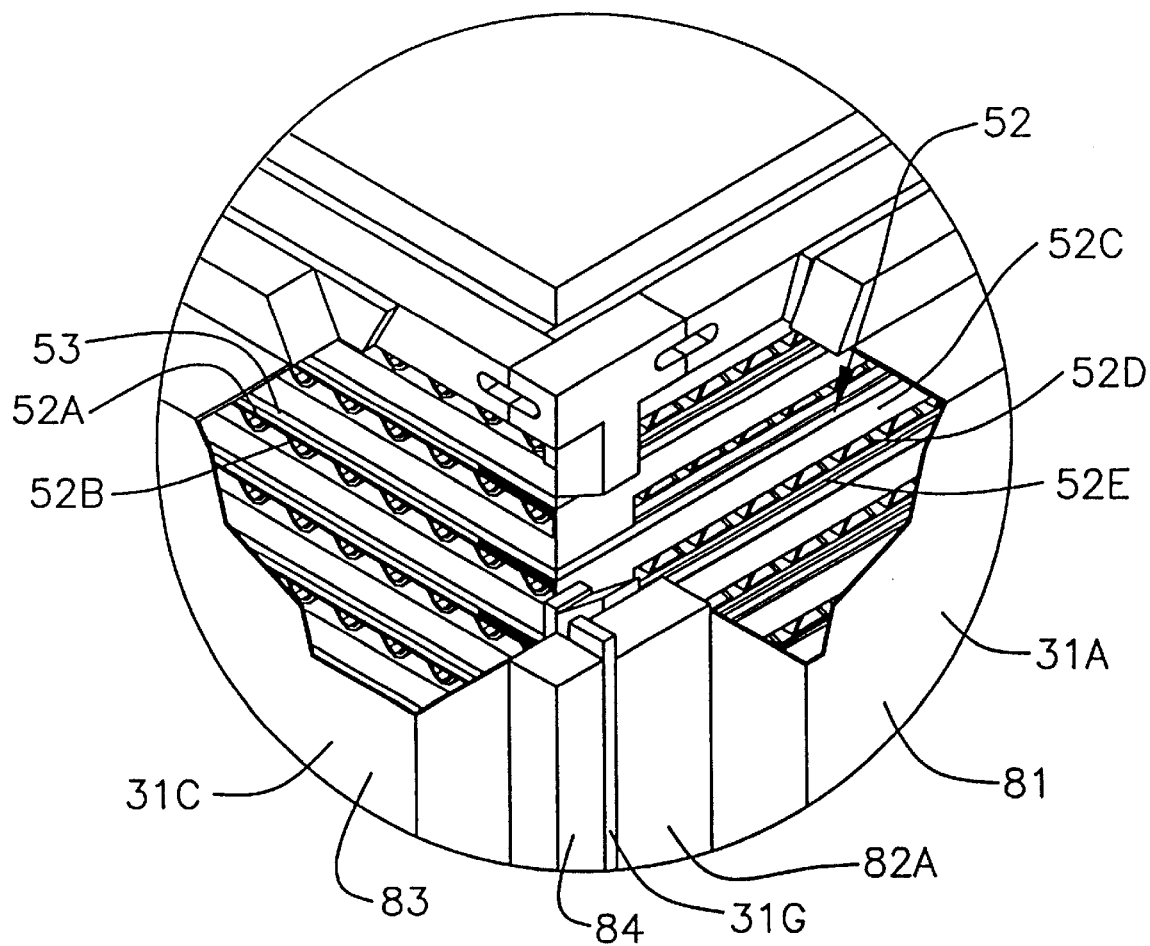
FIGS. 5 and 6 show schematically and pictorially a corner of the manifold and manifold sealing assembly of FIG. 3.

As can be seen in FIG. 5, each assembly 52 is similar to the conventional assembly 11A shown in FIG. 2 and comprises a stacked arrangement of a cathode electrode 52A, a cathode corrugated current collector 52B, a bipolar plate 52C, an anode corrugated current collector 52D and an anode electrode 52E. In the case shown, these components, and, thus, the fuel cell assemblies 52 are of rectangular configuration.

The stacked components result in the stack 21 having four faces 21A, 21B, 21C and 21D. The faces 21A and 21B oppose one another and serve to receive and exhaust fuel gases, respectively. The faces 21 and 21D also oppose one another and they serve to receive and exhaust oxidant gases, respectively.

Like anode manifolds 31A and 31B abut the fuel cell stack faces 21A and 21B to deliver and extract the anode gases from these faces. Like cathode manifolds 31C and 31D, in turn, abut the fuel cell stack faces 21C and 21D to deliver and extract oxidant gases from these faces. Between each manifold and its respective face of the stack 21 are a stack side gasket 31E or 31F, a frame assembly 41 or 42 and a manifold side gasket 31G or 31H. The manifolds, frame assemblies and gaskets together form the manifold and manifold sealing assembly 31 for the stack 21.

In accordance with the principles of the present invention, the manifold and manifold sealing assembly 31 is adapted to provide the manifolding and sealing function with a reduced number components. This is accomplished by utilizing a frame assembly, i.e., a supporting frame assembly, associated with one face of the stack to provide structural support for parts of a frame assembly, i.e., a supported frame assembly, is associated with an adjacent face of the stack. It is further accomplished by adapting the manifolds abutting a supporting and a supported frame assembly to sealing engage in areas adjacent where the supporting frame assembly supports the supported frame assembly.

Figure 4:
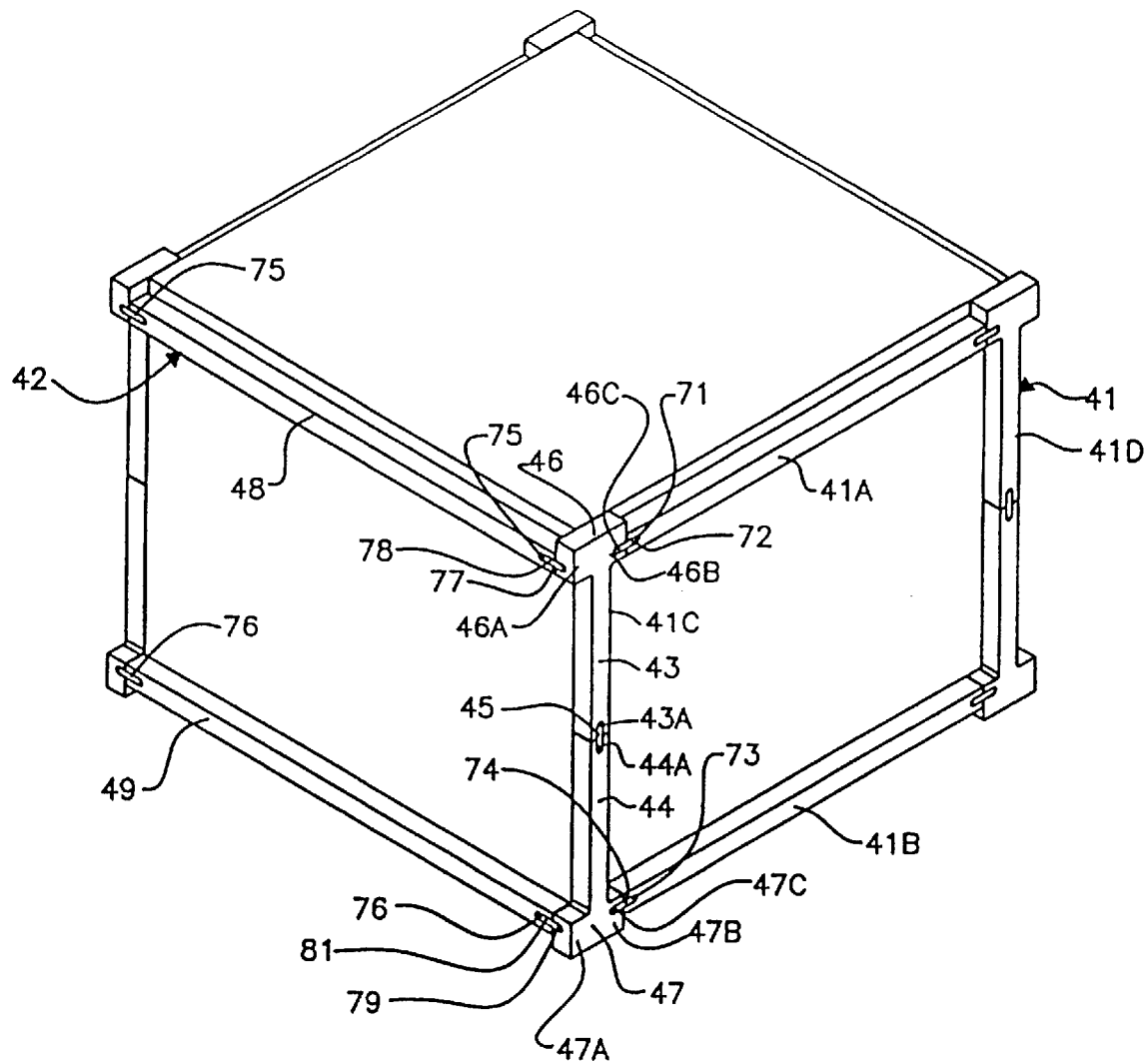
FIG. 4 illustrates the frame assemblies of the manifold and manifold sealing assembly of FIG. 3.

In the present illustrative embodiment, like supporting frame assemblies 41 are arranged adjacent the stack faces 21A and 21B. These frame assemblies provide support for like supported frame assemblies 42 arranged adjacent the stack faces 21C and 21D. FIG. 4 shows the frame assemblies 41 and 42 in greater detail. Each supporting frame assembly 41 comprises upper and lower horizontal frame members 41A and 41B which abut upper and lower edges of the associated stack face. Vertical frame members 41C and 41D of the frame assembly 41 lie adjacent the vertical edges of the associated stack face.

The vertical frame members 41C and 41D each include an upper section 43 and a lower section 44. These sections have keyways or slots 43A and 44A at their butting ends which receive a key 45 which holds the sections together. An enlarged end 46 of the upper section 43 lies adjacent the upper edge of the stack face and an enlarged end 47 of the lower section lies adjacent the lower edge of the stack face. The end 46 has a part 46A which extends beyond the stack face and a part 46B which extends along the stack face. Similarly, the end 47 has a part 47A which extends beyond the stack face and a part 47B which extends along the stack face.

The part 46B is keyed or slotted at 46C and this slot is aligned with a slot or keyway 71 in the adjoining end of the upper horizontal member 41A. A key 72 is received in the adjoining slots and holds the members together. Similarly, the part 47B has a slot or keyway 47C which aligns with a slot 73 in the adjoining end of the lower horizontal member 41B. A key 74 is received in these slots and holds the members together.

Each supported frame assembly 42, in turn, includes upper and lower horizontal members 48 and 49 which run adjacent the upper and lower edges of the associated stack face. The members 48 and 49 have respective slots or keyways 75 and 76 at their respective ends adjacent to the vertical edges of the associated stack face. Each slot 75 aligns with a similarly directed slot in 77 in the part 46A of the vertical frame member of the adjoining supporting frame assembly 41. A key 78 joins these members together. Each slot 76 aligns with a similarly directed slot 79 in the part 47A of the vertical frame member 41 of the supporting frame assembly 41. A key 81 joins these members together.

As can be appreciated, with this configuration of the frame assemblies 41 and 42, the supporting frame assemblies 41 include vertical members 41C, 41D which support not only the horizontal members 41A, 41B of that supporting frame assembly, but also the horizontal members 48, 49 of the adjacent supported frame assemblies 42. In this way, the total number of components of the frame assemblies is reduced, thereby simplifying and significantly reducing the cost of the manifold and manifold frame assembly 31.

In order to accommodate the configuration of the supporting and supported frame assemblies 41 and 42, the anode manifolds 31A and 31B and the cathode manifolds 31C and 31D are adapted to sealing engage in the areas where the supporting frame assemblies support the supported frame assemblies. This support occurs in areas of the vertical edges of the faces of the stack and, accordingly, the vertical portions of the manifolds are adapted to provide such sealing engagement.

Figure 6:
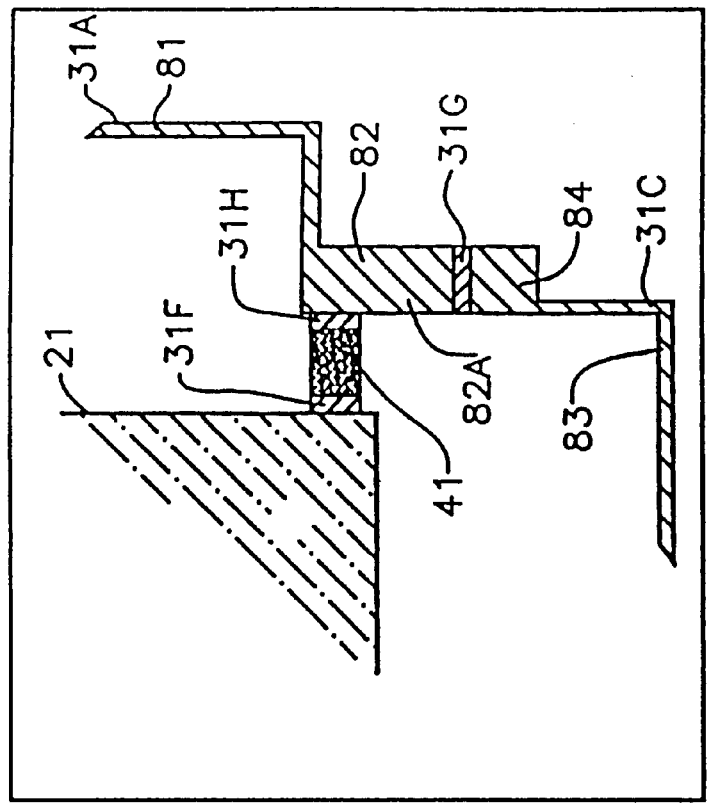

More particularly, referring to FIGS. 3, 5 and 6, the anode manifolds 31A and 31B each have a central area 81 which is bordered by a peripheral flange area 82. The vertical parts of the flange area 82 are further provided with extensions 82A which extend horizontally beyond the vertical edges of the associated stack faces.

Each cathode manifold 31C and 31D, in turn, has a central region 83 which extends beyond the opposite vertical edges of the associated stack face. This brings the peripheral flange 84 of each manifold to a position where the vertical parts of the flange 84 are opposite to the vertical extensions 82A of the adjacent manifolds.

Figure 7:
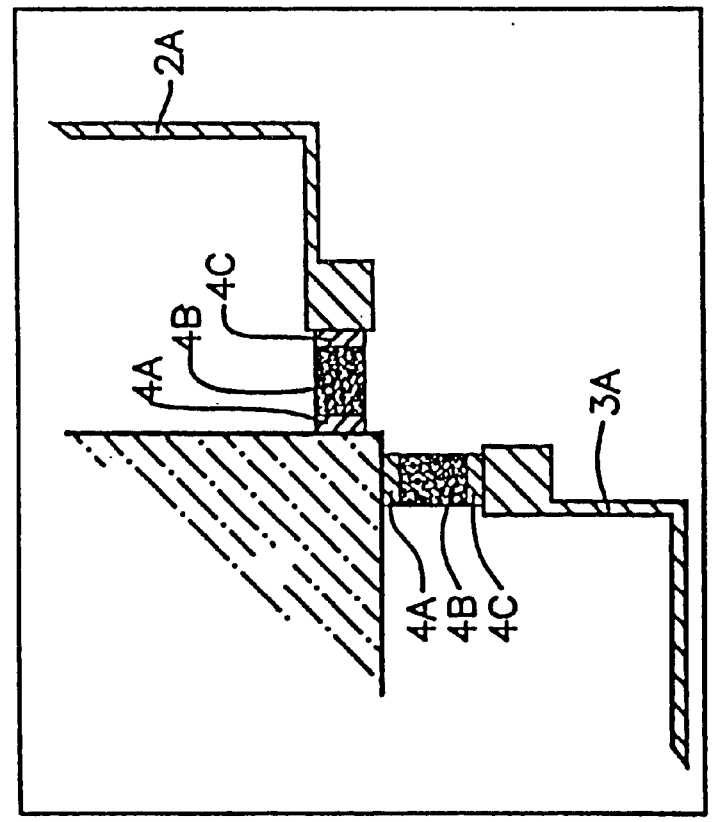
FIG. 7 shows schematically and pictorially a corner of the manifold and manifold sealing assembly of FIG. 1.

In this way, when the manifolds 31A–31D are placed in abutting relationship with the stack faces, the extensions 82A of the anode manifolds 31A and 31B engage the vertical parts of the flanges 84 of the cathode manifolds 31C and 31D. This is shown more clearly in FIGS. 5 and 6 which depict the corner of the stack 21 where the anode manifold 31A and the cathode manifold 31C meet. This engagement differs from that in the stack 1, as shown by the corner section of this stack in FIG. 7.

With the aforesaid configurations for the frame assemblies 41 and 42 and the manifolds 31A–31D, the manifold side gaskets 31H for the anode manifolds 31A and 31B extend around the entire peripheral, flange 82 of each manifold, but do not extend to the extension areas 82A. The manifold side gasket 31G for each of the cathode manifolds also extends around the entire peripheral flange 84 of the manifolds and, thus, becomes situated between the vertical part of the flange 84 and the end of the vertical extension 82A of the adjacent manifold.

The stack side gaskets 31F between the fuel cell stack faces 21A and 21B and each of the supporting frame assemblies 41 each extend around the entire flat peripheral area of their associated stack faces. This peripheral area comprises horizontal portions formed by the end plates 54 and 55 and vertical portions formed by the flap regions on the anode side of the bipolar plates 52C. Both horizontal and vertical portions are needed, since the frame assemblies 41 have horizontal and vertical members.

The stack side gaskets 31E between the fuel cell the stack faces 21C and 21D, however, only need extend horizontally to accommodate the horizontal flat peripheral areas of the associated stack faces formed by the end plates 54 and 55 and the horizontal members of the frame assembly 42. Since the assemblies 42 have no vertical members, these stack faces do not need flat peripheral vertical portions. Accordingly, the bipolar plates 52C on the cathode side of the stack need have no flap regions.

As can be appreciated, the manifold and sealing assembly 31 of the invention provides the advantage of reducing the number of parts of the frame assemblies 41 and 42 as compared to prior assemblies. For the four face stack 21 illustrated in FIG. 3, the number of parts is reduced from 64 to 36 as shown in Table 1 below.

TABLE 1

Figure 1:
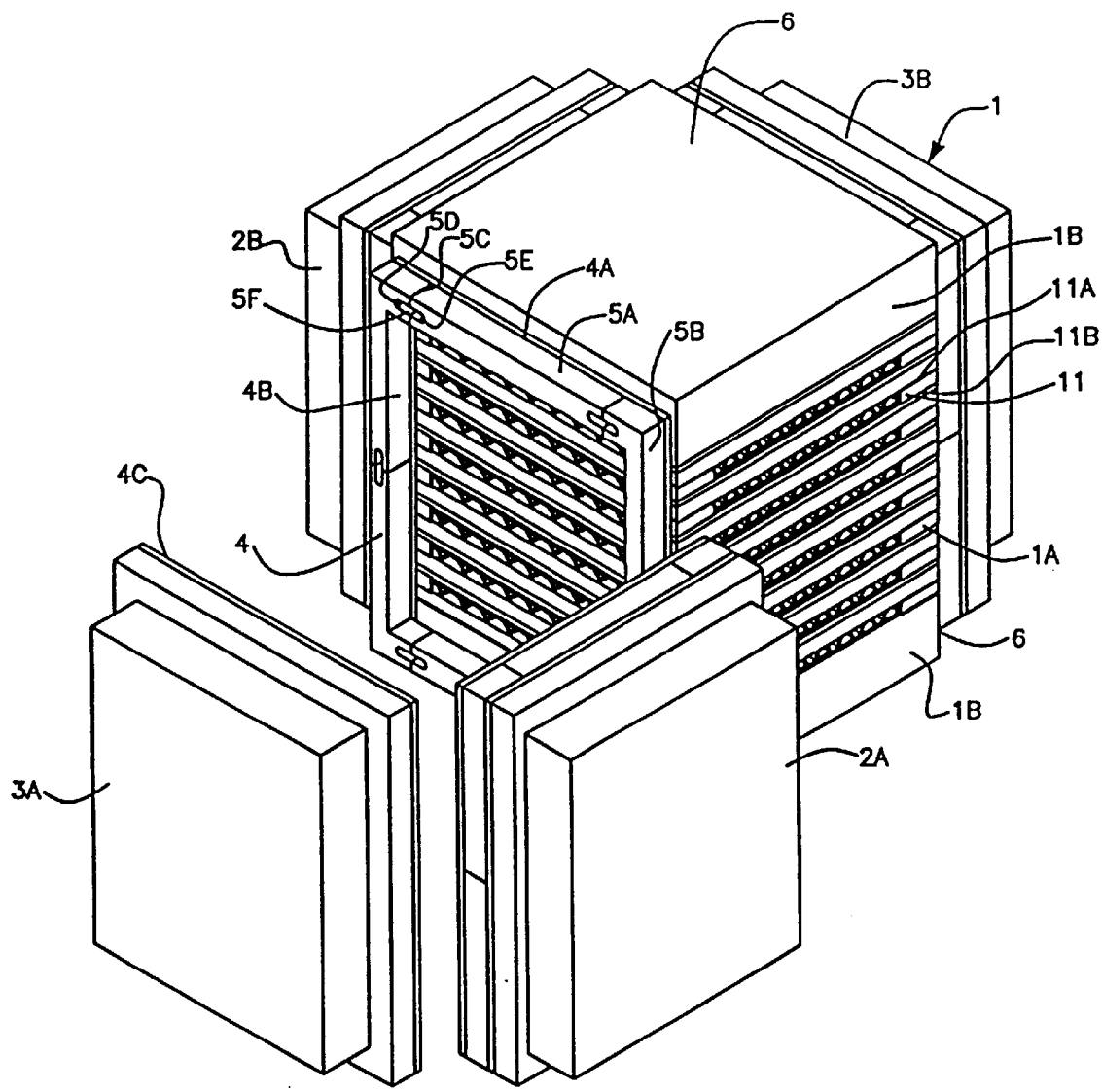
FIG. 1 shows a fuel cell stack employing known manifolds and a known manifold sealing assembly.

| Part | Prior Art | | Invention | |
| --- | --- | --- | --- | --- |
| | FIG. 1 | 3 Manifold Design | FIG. 3 | 3 Manifold Design |
| Bar | 16 | 12 | 8 | 6 |
| Corner | 16 | 12 | 8 | 8 |
| Key Joint | 32 | 24 | 20 | 16 |
| Total | 64 | 48 | 36 | 30 |

Table 1 also shows the reduction in the number of parts of a three manifold system in accordance with the invention as compared to a conventional three manifold system (parts reduced from 48 to 30).

Additionally, with the manifold and manifold sealing assembly 31 of the invention the number of gasket parts contacting the stack face is reduced and electrolyte migration is reduced. Moreover, gas leakage for the anode in the active area is now into the cathode chamber. The differential pressure for this leakage path is less than in prior assemblies. Also, since the bipolar plate fold or flap on cathode side is no longer used, the bipolar plate corner design is also simplified.

In all cases, it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A manifold and manifold sealing assembly for use with a fuel stack having a plurality of faces, the manifold and manifold sealing assembly comprising:

a plurality of frame assemblies each situated adjacent a face of said fuel cell stack;

one or more of said frame assemblies being a supporting frame assembly and one or more of said frame assemblies being a supported frame assembly, each one or more supporting frame assemblies supporting a part of a supported frame assembly facing a face of said stack adjacent to the face of said stack faced by that supporting frame assembly; each one or more supporting frame assemblies including one or more vertical members, each vertical member being situated adjacent a vertical side of the associated face of said stack;

each one or more supported frame assemblies including upper and lower horizontal members situated adjacent the upper and lower ends of the associated face of said fuel cell stack;

each of the one or more vertical members of a supporting frame assembly having upper and lower ends which support the upper and lower horizontal members of a supported frame assembly supported by that supporting frame assembly;

each of the one or more supporting frame assemblies including upper and lower horizontal members situated adjacent the upper and lower ends of the associated face of the fuel cell stack; the upper and lower ends of the one or more vertical members of each of the one or more supporting frame assemblies respectively supporting the upper and lower horizontal members of that supporting frame assembly;

a plurality of manifolds each situated adjacent a frame assembly, at least one of said plurality of manifolds being situated adjacent a supporting frame assembly and at least one of said plurality of manifolds being situated adjacent the supported frame assembly supported by that supporting frame assembly; and each manifold situated adjacent a supporting frame assembly and the manifold situated adjacent the supported frame assembly supported by that supporting frame assembly being adapted to sealing engage with one another along a vertical side of each manifold.

2. A manifold and manifold sealing assembly in accordance with claim 1 wherein:

the upper and lower ends of each of said vertical members having a first part which extends along the associated face of said stack and a second part which ends in the horizontal direction beyond the vertical side of the associated face of said stack, each said first part supporting a horizontal member of the supporting frame assembly that includes that first part and each said second part supporting a horizontal member of a supported frame assembly supported by the supporting frame assembly that includes that second part.

3. A manifold and manifold sealing assembly in accordance with claim 1, wherein:

each manifold abutting a supporting frame assembly includes a central area, a flange area, the flange area including along each vertical side adjacent a vertical member of the associated supporting frame assembly a vertical extension which extends beyond the corresponding vertical side of the associated face of said stack;

and each manifold abutting a supported frame assembly including a central area and a flange area, the central area extending beyond the side of the associated face of the fuel cell stack so that a vertical portion of the flange area abuts a vertical extension of a manifold abutting a supporting frame assembly.

4. A manifold and manifold sealing assembly in accordance with claim 3, further comprising:

a plurality of first gaskets, each first gasket being situated between a frame assembly and the associated face of said stack;

and a plurality of second gaskets, each second gasket being situated between a frame assembly and the associated manifold.

5. A manifold and manifold sealing assembly in accordance with claim 4, wherein:

each second gasket situated between a supported frame assembly and the associated manifold also extends between the vertical portions of the flange area of that manifold and the abutting vertical extensions of the associated supporting manifold.

6. A manifold and manifold sealing assembly in accordance with claim 2 wherein:

each manifold abutting a supporting frame assembly includes:

a central area; and a flange area, the flange area including along each vertical side adjacent a vertical member of the associated supporting frame assembly a vertical extension which extends beyond the corresponding vertical side of the associated face of said stack;

and each manifold abutting a supported frame including a central area and a flange area, the central area extending beyond the side of the associated face of the fuel cell stack so that a vertical portion of the flange area abuts a vertical extension of a manifold abutting a supporting frame assembly.

7. A manifold and manifold sealing assembly in accordance with claim 6, wherein:

each said first part and each said second part includes a slot;

each of the upper and lower horizontal members of the one or more supporting frame assemblies and the one or more supported frame assemblies includes a slot at the end of the member, the slot in each of the upper and lower horizontal members aligning with the slot in the one of the first and second parts supporting that horizontal member;

and said manifold and manifold sealing assembly further comprising keys each inserted in a given set of the aligned slots.

8. A manifold and manifold sealing assembly in accordance with claim 7, wherein:

each of said vertical members includes upper and lower portions, said upper portion having a first end defining said upper end and a second end, and said lower portion having a first end defining said lower end and a second end.

9. A manifold and manifold sealing assembly in accordance with claim 8, wherein:

said second end of said upper portion and said second end of said and lower portion adjoin each other and include aligning slots;

and said manifold and manifold sealing assembly includes further keys each inserted in the aligning slots of said upper and lower portions.

10. A manifold and manifold sealing assembly in accordance with claim 9, wherein:

first and second supporting frame assemblies each support a part of a third supported frame assembly.

11. A manifold and manifold sealing assembly in accordance with claim 10, wherein:

said first and second supporting frame assemblies face opposing faces of said fuel cell stack.

12. A manifold and manifold sealing assembly in accordance with claim 11, wherein:

said first and second supporting frame assemblies having first and second vertical members situated adjacent opposite vertical sides of the associated face of said stack.

13. A manifold and manifold sealing assembly in accordance with claim 10, wherein:

said first and second frame assemblies each support a part of a fourth supported frame assembly.

14. A manifold and manifold sealing assembly in accordance with claim 12, wherein:

said first and second supporting frame assemblies face first and second opposing faces of said stack; and said third and fourth supported frame assemblies face third and fourth opposing faces of said stack.

15. A manifold and manifold sealing assembly in accordance with claim 13, wherein:

said first and second supporting frame assemblies each having first and second vertical members situated adjacent opposite vertical sides of the associated face of said stack.

16. A manifold for use in abutting relationship to a supported frame assembly facing a face of a fuel cell stack and which is supported by one or more supporting frame assemblies each facing an adjacent face of the stack, the manifold comprising:

a central area;

a flange area extending from the central area; and said central area extending beyond a vertical side of the associated face of said stack so as to bring said flange area into engagement with an extension of a manifold facing a supporting frame assembly.

17. A manifold in accordance with claim 16, wherein:

said supported frame assembly is supported by first and second supporting frame assemblies; and said central area extends beyond opposite vertical sides of the associated face of said stack so as to bring said flange area into engagement with extensions of first and second manifolds facing said first and second supporting frame assemblies, respectively.

18. A fuel cell system comprising:

A fuel cell stack having a plurality of faces;

a manifold and sealing assembly for said fuel cell stack comprising: a plurality of frame assemblies each situated adjacent a face of said fuel cell stack; one or more of said frame assemblies being a supporting frame assembly and one or more of said frame assemblies being a supported frame assembly, each one or more supporting frame assemblies supporting a part of a supported frame assembly facing a face of said stack adjacent to the face of said stack faced by that supporting frame assembly; each one or more supporting frame assemblies including one or more vertical members, each vertical member being situated adjacent a vertical side of the associated face of said stack; each one or more supported frame assemblies including upper and lower horizontal members situated adjacent the upper and lower ends of the associated face of said fuel cell stack; each of the one or more vertical members of a supporting frame assembly having upper and lower ends which support the upper and lower horizontal members of a supported frame assembly supported by that supporting frame assembly; each of the one or more supporting frame assemblies including upper and lower horizontal members situated adjacent the upper and lower ends of the associated face of the fuel cell stack; the upper and lower ends of the one or more vertical members of each of the one or more supporting frame assemblies respectively supporting the upper and lower horizontal members of that supporting frame assembly; a plurality of manifolds each situated adjacent a frame assembly, at least one of said plurality of manifolds being situated adjacent a supporting frame assembly and at least one of said plurality of manifolds being situated adjacent the supported frame assembly supported by that supporting frame assembly; and each manifold situated adjacent a supporting frame assembly and the manifold situated adjacent the supported frame assembly supported by that supporting frame assembly being adapted to sealing engage with one another along a vertical side of each manifold.

19. A fuel cell system in accordance with claim 18, wherein:

said fuel cell stack includes a plurality of fuel cell assemblies having bipolar plates, said bipolar plates having flap regions in the parts thereof defining the faces of said fuel cell stack facing the supporting frame assemblies and being devoid of flap regions in the parts thereof defining the faces of said fuel cell stack facing said supported assemblies.

20. A manifold for use in abutting relationship to a supporting frame assembly facing a face of a fuel cell stack and which supports one or more supported frame assemblies each facing an adjacent face of the fuel cell stack, the manifold comprising:

a central area;

and a flange area extending from the central area and having an extension which extends beyond a vertical side of the associated face of the fuel cell stack for engaging with a manifold facing a supported frame assembly.

21. A manifold in accordance with claim 20, wherein:

said supporting frame assembly supports first and second supported frame assemblies; and said flange area has extensions which extend beyond opposite vertical sides of said associated face for engaging first and second manifolds facing said first and second supported frame assemblies, respectively.

* * * * *